US012205307B2

(12) United States Patent
Herbst et al.

(10) Patent No.: US 12,205,307 B2
(45) Date of Patent: Jan. 21, 2025

(54) SCANNING DEVICE FOR SCANNING AN ENVIRONMENT AND ENABLING AN IDENTIFICATION OF SCANNED MOVING OBJECTS

(71) Applicant: LEICA GEOSYSTEM AG, Heerbrugg (CH)

(72) Inventors: Christoph Herbst, Dornbirn (AT); Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 572 days.

(21) Appl. No.: 17/527,850

(22) Filed: Nov. 16, 2021

(65) Prior Publication Data

US 2022/0156950 A1 May 19, 2022

(30) Foreign Application Priority Data

Nov. 17, 2020 (EP) .................... 20208168

(51) Int. Cl.
*G06T 7/277* (2017.01)
*G01S 17/04* (2020.01)
*G01S 17/06* (2006.01)

(52) U.S. Cl.
CPC .............. *G06T 7/277* (2017.01); *G01S 17/04* (2020.01); *G01S 17/06* (2013.01)

(58) Field of Classification Search
CPC ......... G06T 7/277; G01S 17/04; G01S 17/06; G01S 17/42; G01S 17/50; G01S 17/89; G01C 15/002; G01C 15/00; G01B 11/2433; G01B 11/24
See application file for complete search history.

(56) References Cited

U.S. PATENT DOCUMENTS

| 8,384,914 | B2 | 2/2013 | Becker et al. | |
| 2006/0164643 | A1* | 7/2006 | Giakos | G01J 3/433 356/369 |
| 2014/0078519 | A1* | 3/2014 | Steffey | G02B 26/10 356/625 |
| 2014/0300892 | A1 | 10/2014 | Zogg et al. | |
| 2014/0350886 | A1* | 11/2014 | Metzler | G01S 7/003 702/150 |
| 2015/0073745 | A1 | 3/2015 | Mizuno et al. | |

FOREIGN PATENT DOCUMENTS

| CN | 102232197 A | 11/2011 |
| CN | 103994729 A | 8/2014 |
| CN | 104101333 A | 10/2014 |
| CN | 108303037 A | 7/2018 |
| CN | 111383132 A | 7/2020 |
| JP | 2007-240342 A | 9/2007 |

OTHER PUBLICATIONS

EP Search Report in Application No. 20 20 8168 dated Apr. 20, 2021.

* cited by examiner

Primary Examiner — Alexander Satanovsky
Assistant Examiner — Asm Fakhruddin
(74) Attorney, Agent, or Firm — Maschoff Brennan

(57) ABSTRACT

The present disclosure relates to a scanning device being configured to enable efficient identification of scanned measurement points being associated with moving objects in an otherwise static environment. The scanning device is built as total station or laser scanner being typically used for scanning an environment and enabling, based on the scanning, the generation of a three dimensional (3D) point cloud representing the scanned environment.

18 Claims, 5 Drawing Sheets

SCANNING DEVICE FOR SCANNING AN ENVIRONMENT AND ENABLING AN IDENTIFICATION OF SCANNED MOVING OBJECTS

BACKGROUND

The present disclosure relates to a scanning device being configured to enable efficient identification of scanned measurement points being associated with moving objects. The scanning device is built as total station or laser scanner being typically used for scanning an environment and enabling, based on the scanning, the generation of a three dimensional (3D) point cloud representing the scanned environment. Thereby each point of the point cloud relates to a scanned or measured measurement point of the environment. A moving object is an object in the scanned environment, which is moving relative to the environment while the environment is being scanned. In order to visualize the scanned environment, without moving objects and based on the point cloud, scanned/measured moving objects need to be identified.

Known methods related to identifying scanned moving objects in a scanned environment rely on scanning the environment for a first time followed by scanning the environment for a second time. Based on comparing scan data of the first scan with scan data of the second scan differences in the scan data are identified, wherein such differences are indicative for the presence of a moving object in the scanned environment. Such methods rely on scanning the same environment twice in the same manner. In other words, known methods rely on sacrificing scan time for retrieving additional information, in the form of differences in the scan data, being indicative for the presence of a moving object in the scanned environment.

SUMMARY

Aspects of the present disclosure provide a scanning device, which allows to more efficiently scan an environment and identify scanned/measured moving objects in the scanned environment.

This is achieved by realizing the features of the claims and the disclosure herein. Such features are set forth in the disclosure and claims.

According to one aspect, a scanning device, built as total station or laser scanner is configured to enable an efficient identification of scanned measurement points being associated with moving objects and has
 a stator defining a vertical axis,
 a rotor mounted on the stator so as to be rotatable about the vertical axis,
 a rotary body, mounted on the rotor so as to be rotatable about a horizontal axis, with an exit for measuring radiation and an entry for receiving radiation,
 a rotary drive unit,
 an angle encoding unit,
 a measuring radiation source,
 a receiving radiation detecting unit,
 an evaluation unit, and
 a control unit.

Thereby, the vertical axis is substantially orthogonal to the horizontal axis, the rotary drive unit rotates the rotor and the rotary body, the measuring radiation exits the rotary body in a predefined measuring direction along a target axis to a measurement point, the angle encoding unit provides horizontal angle determination data and vertical angle determination data for determining a vertical angle and a horizontal angle of the target axis, the evaluation unit records distance measurement data and related angle determination data based on detected receiving radiation, and the control unit is configured to guide the measuring radiation during a first time interval along a first section of a scan path to first measurement points under predefined first vertical and first horizontal angles on the first section, and during a second time interval along a second section of the scan path to second measurement points under predefined second vertical and second horizontal angles on the second section.

Thereby, the first and second time intervals are offset in time relative to each other, in particular wherein an upper time interval boundary of one time interval equals or is in time before a lower time interval boundary of the other time interval. In other words the time intervals are consecutive time intervals with no overlap.

Furthermore, for at least a plurality of the second measurement points, the second measurement point is located between two adjacent first measurement points, such that the second vertical angle of the second measurement point is between first vertical angles of the two adjacent first measurement points, and/or the second horizontal angle of the second measurement point is between first horizontal angles of the two adjacent first measurement points.

The stator typically includes a mounting for the rotor and a support, for example a tripod or multi leg support, for positioning the scanning device on the ground. The vertical axis defined by the stator thereby relates to the standing axis of the scanning device. The terms vertical and horizontal axis are used here in connection with a standard use case for the scanning device, where the scanning device is installed on the ground. Nevertheless, the vertical and horizontal axis can as well be a first rotational axis and a second rotational axis respectively in case the scanning device is installed for example on a wall or on a inclined surface. Depending on the kind of scanning device the rotor can be referred to as alidade and the rotary body as telescope. Then the vertical axis can be referred to as azimuthal axis and the horizontal axis as elevation axis.

The rotor and rotary body are driven by the rotary drive unit. The rotary drive unit is built such that driving the rotor and rotary body can be effected independently from each other. The rotary drive unit is communicatively connected to the control unit. Driving the rotor and rotary body is controlled by the control unit.

The angle encoding unit provides vertical angle determination data based on which a vertical angle and thereby an orientation of the rotor with respect to the vertical axis is determined, and horizontal angle determination data based on which a horizontal angle and thereby an orientation of the rotary body with respect to the horizontal axis is determined.

The scanning device uses measuring radiation, for example laser radiation, for measuring measurement points of the environment to be scanned. The measuring radiation is generated by the measuring radiation source of the scanning device. The measuring radiation is exiting from the rotary body by an exit included by the rotary body. For example, in case the rotary body is a telescope, by a window. The exit for the measuring radiation can also be, for example, a deflecting optical element included by the rotary body and deflecting the measuring radiation towards a measurement point in the environment. Analogously, the rotary body includes an entry for receiving radiation. Receiving radiation is measuring radiation being reflected from the targeted and irradiated measurement point in the environment towards the scanning device. For example in case the rotary body is a telescope receiving radiation can enter by the same window by which the measuring radiation exits from the rotary body. In case the exit is a deflecting optical element, receiving radiation can enter by the same deflecting optical element, wherein the deflecting optical element deflects receiving radiation towards a receiving radiation detecting unit of the scanning device.

Scanning an environment by the scanning device relates to guiding measuring radiation to measurement points of the environment and determining the distance of the measurement points to the scanning device in order to determine the position of the measurement points in three dimensions. A measurement point can be for example a point on a face/surface of the environment or of an object of the environment. The measuring radiation exits from the rotary body in a measuring direction along a target axis towards a targeted measurement point. The orientation of the target axis is controlled and determined by the orientation of the rotor and rotary body and therefore based on the vertical and horizontal angles derivable using the angle encoding unit. Receiving radiation entering the scanning device is detected by the receiving radiation detecting unit. The receiving radiation detecting unit is communicatively connected to the evaluation unit. The receiving radiation detecting unit provides distance measurement data resulting from detecting receiving radiation. Data derivable from detecting receiving radiation can be intensity data, related to the detected intensity of the receiving radiation or distance data related to the distance of the measurement point to the scanning device and a combination of both. Distance measurement data can include distance data determining a measured distance of the measurement point to the scanning device. Distance measurement data can further include intensity data. Distance measurement data can further include additional data characterizing a measurement point.

The evaluation unit records the distance measurement data, related vertical angle determination data and horizontal angle determination data in order to assign to the measurement point, the vertical angle and the horizontal angle under which the measurement point is targeted and the distance measurement data to the measurement point. For example, a measured distance and intensity data are assigned to a measurement point. Therefrom the position of the measurement point in 3D with reference to the scanning device's position is retrievable and available for generating a 3D point of a 3D point cloud representing the scanned environment.

Properties of an as-derived 3D point cloud are, to a large extent, determined by the amount of scanned/measured measurement points in the environment and their positioning relative to each other. The amount and the positioning of the measurement points are predetermined by the applied scan routine. The scan routine defines the scan path along which the measuring radiation is guided and also the vertical and horizontal angular position of the measurement points on the scan path and thereby relative to each other. For example, the scan routine defines the rotary movement of the rotor, the rotary movement of the rotary body and a frequency with which measuring radiation is exiting the rotary body towards a measurement point. Thereby, the scan path and the angular position of measurement points on the scan path is predefined.

The control unit is configured to guide the measuring radiation along the scan path to measurement points as predefined by the active scan routine.

According to some aspects, the control unit is configured to guide the measuring radiation along a predefined scan path. During a first time interval, the measuring radiation is guided along a first section of the scan path and to first measurement points on this first section. These first measurement points are targeted under predefined first vertical angles and predefined first horizontal angles. In other words each first measurement point is targeted under a predefined first vertical and a predefined first horizontal angle. During a second time interval, the measuring radiation is guided along a second section of the same scan path and to second measurement points on this second section. These second measurement points are targeted under predefined second vertical angles and predefined second horizontal angles. In other words each second measurement point is targeted under a predefined second vertical and a predefined second horizontal angle.

Thereby, the first and the second time intervals are offset in time relative to each other such that they do not overlap each other. For example—the time intervals being defined each by a lower and an upper time interval boundary—the lower and upper boundary of one time interval is not comprised by the other time interval in such a way that the time intervals do not overlap. For example, the time intervals can be consecutive time intervals such that the upper boundary of the first time interval equals the lower boundary of the second time interval.

According to some aspects, for at least a plurality of the second measurement points, the second measurement point is located between two adjacent first measurement points. With other words, each of at least a plurality of second measurement points is located between two adjacent first measurement points. A second measurement point being located between two adjacent first measurement points is targeted under a predefined second vertical angle, which is between the predefined first vertical angles of the two adjacent first measurement points and/or under a predefined second horizontal angle, which is between the predefined first horizontal angles of the two adjacent first measurement points. In other words, the angular position of second measurement points of at least a plurality of second measurement points is predefined such that each of them is between two adjacent first measurement points.

The time-offset measurement/scanning of the first and second measurement points relative to each other enables, for example by further processing the recorded data, identifying measurement points being associated with an object that moves during the time that passes between the measurement/scanning of the relevant first measurement points and relevant second measurement points. Furthermore, based on the identification of such measurement points moving objects can be identified. Thereby, in contrast to known methods the herein described scanning device uses measuring time for retrieving additional information from distance measurement data being indicative for the presence of a moving object in the scanned environment and for increasing the amount of measured/scanned measurement points, such that a 3D point cloud can be generated based on the distance measurement data with increased resolution. In other words, within the measurement time, which known methods sacrifice for "only" identifying moving objects the herein described scanning device allows to identify moving objects and increases, in particular doubles, the spatial resolution of recorded distance measurement data. A—based thereon—generated 3D point cloud can be a filtered point cloud, filtered with respect to moving objects, and exhibit an increased, in particular doubled resolution in comparison to known methods.

Alternatively, the herein described scanning device enables the generation of a filtered 3D point cloud, representing the scanned environment, having spatial resolution according to known methods, wherein the involved measurement time is drastically reduced, in particular the involved measurement time is halved.

According to some aspects, the evaluation unit is configured to evaluate distance measurement data of at least one first measurement point neighboring a second measurement point, and distance measurement data of the second measurement point for identifying a mismatch between the distance measurement data.

Distance measurement data can include distance data, intensity data and further data, which can be used for evaluating measurement points.

Distance measurement data can include distance data, which allows for the determination of a measured distance from the scanning device to the measurement point, for example a time span if the distance is determined based on the time-of-flight principle. Distance measurement data can further include distance data optionally together with intensity data. Intensity data relating to an intensity of detected receiving radiation. Thereby, the detected intensity can depend on, for example, the distance from the scanning device to the measurement point and/or the reflective properties of the face/surface from which the measuring radiation is reflected to the scanning device etc.

Distance measurement data of first measurement points neighboring a second measurement point should correlate with distance measurement data of the second measurement point in accordance with physical constraints of the environment scanned during the first time interval. Such physical constraints are represented in and derivable from the distance measurement data of the first measurement points. If such a correlation is in accordance with the physical constraints of the environment being represented in the distance measurement data of the first measurement points neighboring the second measurement point, the distance measurement data match. If such a correlation is not in accordance with the physical constraints of the environment being represented in the distance measurement data of the first measurement points neighboring the second measurement point, the distance measurement data mismatch. Identifying a mismatch is indicating that the second measurement point is a measurement point associated with a moving object in the environment. Such a measurement point can then be marked for example for further processing in order to enable an efficient identification of the moving object. Based on marked measurement points and identified moving objects a 3D point cloud representing the scanned environment can be generated. Thereby, 3D points of the point cloud associated with a moving object can for example either not be generated or be filtered such that the 3D point cloud represents the scanned environment without the moving object.

The time intervals are offset in time relative to each other for example such that the first time interval precedes the second time interval or the second time interval precedes the first time interval.

The evaluation unit can therefore use either distance measurement data of first measurement points as relevant basis for evaluating the distance measurement data of a second measurement point, wherein the identification of a mismatch is indicating that the second measurement point is a measurement point associated with a moving object in the environment. Or, vice versa, the evaluation unit can use distance measurement data of second measurement points as relevant basis for evaluating the distance measurement data of a first measurement point, wherein the identification of a mismatch is indicating that the first measurement point is a measurement point associated with a moving object in the environment. The evaluation unit can as well use a combination of both evaluation principles.

The above-described principle does as well include further configurations of the control unit and/or evaluation unit. For example, the control unit can be configured to guide the measuring radiation during a further third time interval along a third section of the scan path to third measurement points under predefined third vertical and third horizontal angles on the third section. Then, the evaluation unit can be configured, for example, to evaluate distance measurement data of at least one first measurement point neighboring a second measurement point, distance measurement data of at least one third measurement point neighboring the second measurement point, and distance measurement data of the second measurement point for identifying a mismatch between the distance measurement data. Or, the evaluation unit can be configured, for example, to evaluate distance measurement data of at least one second measurement point neighboring a first measurement point, distance measurement data of at least one third measurement point neighboring the first measurement point, and distance measurement data of the first measurement point for identifying a mismatch between the distance measurement data etc.

According to some aspects, identifying a mismatch is based on interpolating distance measurement data of more than one first measurement point neighboring the second measurement point to obtain interpolated distance measurement data for the second measurement point and comparing the distance measurement data of the second measurement point with the interpolated distance measurement data.

A mismatch between distance measurement data of a first measurement point and distance measurement data of a second measurement point or between distance measurement data and interpolated distance measurement data is identified for example if a difference between the distance measurement data exceeds a predefined difference threshold.

Identifying a mismatch can as well be based on interpolating distance measurement data of more than one second measurement point neighboring the first measurement point to obtain interpolated distance measurement data for the first measurement point and comparing the distance measurement data of the first measurement point with the interpolated distance measurement data. Interpolating distance measurement data can also relate to interpolating measured distances and/or intensities, wherein measured distances and/or intensities are derivable from the distance measurement data.

According to a further embodiment, one of a vertical angular distance, and a horizontal angular distance between measurement points is used for determining neighboring measurement points based on one of the principles of nearest neighbor analysis, and of using an angular distance threshold value.

Thereby, an angular distance relates to the angular difference between two angles. For example in order to determine first measurement points to be used for interpolation, the first measurement points being nearest/second nearest/third nearest etc. neighbors to the second measurement point can be selected. Or, for example, a vertical angular distance threshold value can be defined. First measurement points having a vertical angle within the vertical angular distance threshold from the vertical angle of the second measurement point are selected and used for interpolation. Analogous applies for vertical angular distance, vertical angles and vertical angular distance threshold value and for determining second measurement points to be used for interpolation.

According to a further embodiment, neighboring measurement points are filtered based on applying a filter criteria relating to a shape property, wherein the shape property is derived from analyzing distance measurement data of measurement points of a surrounding of the neighboring measurement points.

Distance measurement data of measurement points can be analyzed in order to determine objects and their shape. An object can, for example, be a surface/face or comprise a plurality of surfaces/faces. An as-determined object has characteristic shape properties. Applying a filter criteria relating to a shape property can, for example, refer to filtering determined neighboring measurement points by applying the filter criteria relating to a determined surface such that only neighboring measurement points being points of the determined surface are used for identifying a mismatch.

Thereby, determined neighboring measurement points, which should not be considered for identifying a mismatch due to physical constraints of the scanned object, for example because they belong to a different face/surface, can be filtered and therefore do not lead to a false identification of a mismatch.

According to a further embodiment, the evaluation unit is configured to mark distance measurement data and/or measurement points based on an identified mismatch.

Marked distance measurement data and/or measurement points can be used in further processing the data for efficiently identifying moving objects.

According to a further embodiment, the evaluation unit is configured to filter recorded distance measurement data and/or measurement points with respect to marked distance measurement data and/or measurement points.

Thereby, distance measurement data or measurement points which are provided for generating, based thereon, a 3D point cloud can be "pre-filtered" data.

According to a further embodiment, the evaluation unit is configured to reconstruct marked distance measurement data and/or measurement points based on using distance measurement data of neighboring measurement points.

Reconstructing can, for example, relate to interpolate distance measurement data of neighboring measurement points to determine interpolated distance measurement data for the marked measurement point and assign the interpolated distance measurement data to the marked measurement point. Thereby a false distance measurement data or distance measurement data associated with a moving object is directly replaceable by the reconstructed data.

According to an embodiment, the control unit is configured to rotate the rotor at a first angular velocity, in particular being variable, and the rotary body at a second angular velocity, in particular being variable, wherein guiding the measuring radiation along first and second sections of the scan path is based on superposing a rotary movement of the rotor to a rotary movement of the rotary body.

The rotor rotating at a first angular velocity and the rotary body rotating at a second angular velocity both make a rotary movement. Varying the angular velocity results in an accelerated or decelerated rotary movement of the rotor and/or rotary body. A superposition of the rotary movements depending on the angular velocity ratio of the first angular velocity to the second angular velocity can generate specific scan path patterns if projected onto a unit sphere surrounding the scanning device.

According to a further embodiment, the control unit is configured to rotate the rotor about the vertical axis for 360°, wherein meanwhile the rotor is rotated for 360° the rotary body is consistently rotated about the horizontal axis.

Consistently rotating the rotary body relates to the rotary body performing a fluent rotary movement, which can also be accelerated and/or decelerated, but is not subject to abrupt changes of the movement direction or to significant interruptions of the fluent rotary movement.

According to a further embodiment, in case an angular velocity ratio of the first angular velocity to the second angular velocity is smaller than 1, a section of the scan path along which the measuring radiation is guided meanwhile the rotor is rotated from 0° to 180° around the vertical axis is the first section of the scan path with first measurement points thereon, and a section of the scan path along which the measuring radiation is guided meanwhile the rotor is further rotated from 180° to 360° around the vertical axis is the second section of the scan path with second measurement points thereon, and in case the angular velocity ratio is larger than 1, a section of the scan path along which the measuring radiation is guided meanwhile the rotary body is rotated from 0° to 180° around the horizontal axis is the first section of the scan path with first measurement points thereon, and a section of the scan path along which the measuring radiation is guided meanwhile the rotary body is further rotated from 180° to 360° around the horizontal axis is the second section of the scan path with second measurement points thereon.

According to a further embodiment, the angular velocity ratio is defined such that at least parts of the second section lie between adjacent parts of the first section.

If a part of the second section is lying between parts of the first section the parts do not overlap and are angular distant to each other.

According to an advantageous embodiment, the angular velocity ratio is smaller than 1, in particular equal to or smaller than 1:200, 1:900, 1:1500 or 1:2000, or the angular velocity ratio is larger than 1, in particular equal to or larger than 900:1.

According to an embodiment, the angular velocity ratio is different from 1, within a range from 1:10 to 10:1.

According to a further embodiment, the control unit is further configured to receive a user-input and based on the user-input guide the measuring radiation within a preconfigured scan mode, wherein within the preconfigured scan mode the angular velocity ratio is smaller than 1, and the rotor is rotated about the vertical axis from 0° to 360°, meanwhile the rotary body is rotated about the horizontal axis for 360° multiple times, and the evaluation unit is configured to assign distance measurement data, the vertical angle and the horizontal angle to measurement points, and evaluate distance measurement data of at least one first measurement point neighboring a second measurement point, and the second measurement point for identifying a mismatch between the distance measurement data. The user-input can be effected, for example, by activating a specific button on the scanning device or by a activating a virtual button of a user-terminal being communicatively connected to the control unit.

Some aspects also relate to a computer program product, comprising instructions to configure a scanning device as described above.

The scanning device is described or explained in more detail below, purely by way of example, with reference to working examples shown schematically in the drawings. The described embodiments are generally not shown true to scale and they are also not to be interpreted as limiting the invention.

DETAILED DESCRIPTION

Figure 1:
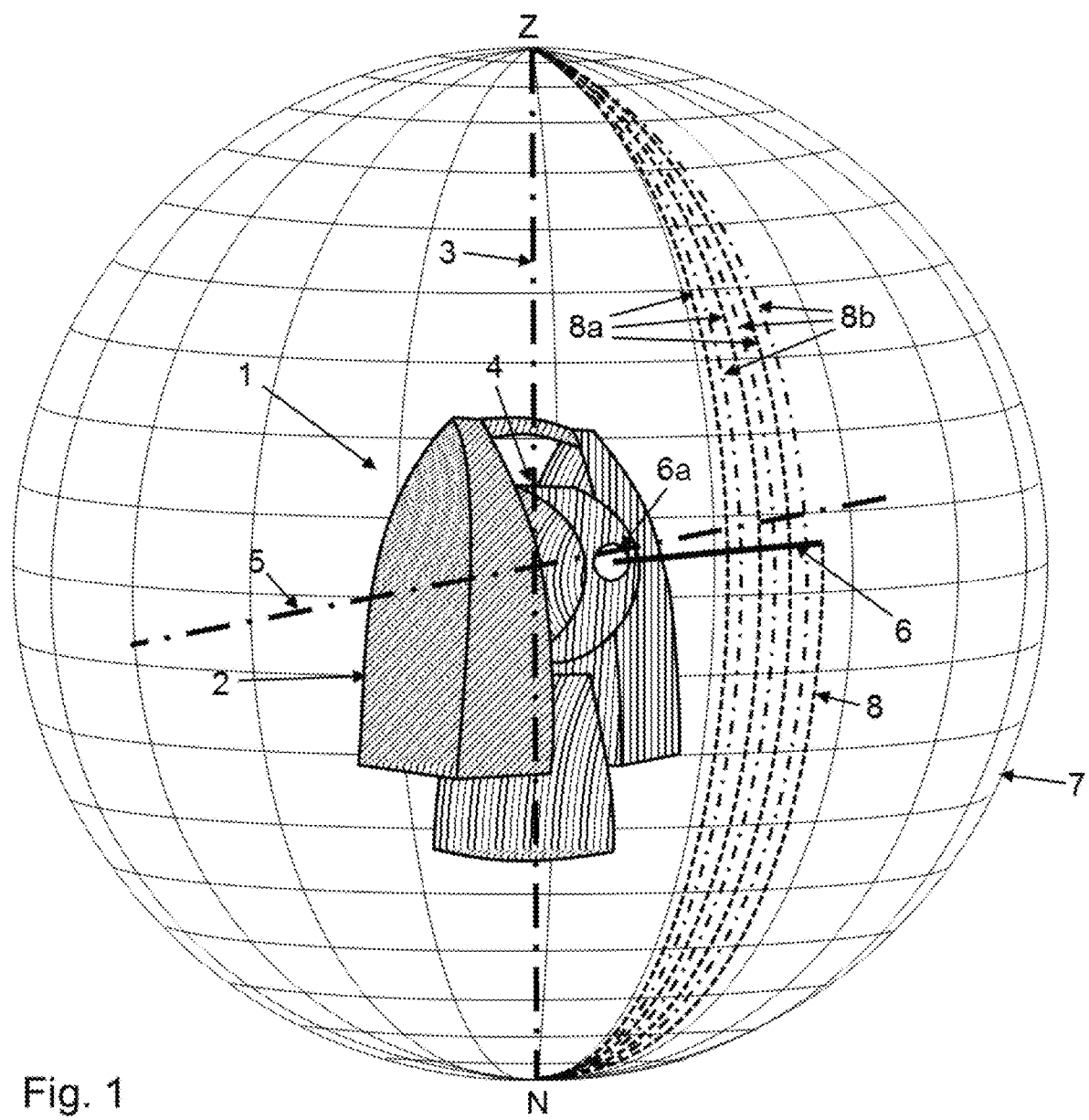
FIGS. 1-3 are schematic perspective views of a scanning device embodied as total station with sections of a scan path visualized on a sphere.

FIG. 1 shows a total station or scanning device 1 with an rotor/alidade 2 mounted on a stator, not shown, and being rotatable about the vertical/azimuthal axis 3 in a motor driven manner. A rotary body/telescope unit 4 is mounted on the rotor/alidade 2 and is movable in the form of a tilting motion about a horizontal/elevation axis 5 in a motor driven manner. The rotary body/telescope unit 4 comprises an exit 6a for measuring radiation 6 defining a target axis. The horizontal/elevation axis 5 is substantially orthogonal to the vertical/azimuthal axis 3. The rotary body/telescope unit 4 is rotated at a higher constant angular velocity than the rotor/alidade 2. The rotor/alidade 2 is rotating during a first time interval over a first half of a circle (200 gon, 180°) for generating parts of the first section 8a of the scan path. The rotor/alidade 2 is rotating during a second time interval over a second half of a circle (200 gon, 180°) for generating parts of the second section 8b of the scan path. The first and the second section of the scan path are providing together a full dome scan.

A part of the scan path generated with a fast rotating rotary body/telescope unit 4 and a slower rotating rotor/alidade 2 is visualized on a sphere 7 with its center at the intersection point of the vertical/azimuthal axis 3 and the horizontal/elevation axis 5. The intersection of the measuring beam 6 with the sphere 7 is moving along the scan path 8. Measurement points are generated are targeted with a constant triggering frequency and are essentially spaced with equal spacing on the path 8. The scan path 8 is passing by the zenith Z and by the nadir N during each rotation of the rotary body/telescope unit 4. Therefore, the path density and correspondingly the measurement point density are very high in areas at the zenith Z and at the nadir N and lower in equatorial areas.

A high measurement point density around the zenith Z and around the nadir N can be prevented—under the premise of applying constant angular velocities—by lowering the triggering frequency in areas at the zenith Z and at the nadir N or by using a scan path with a shorter total extension in these areas.

Figure 2:
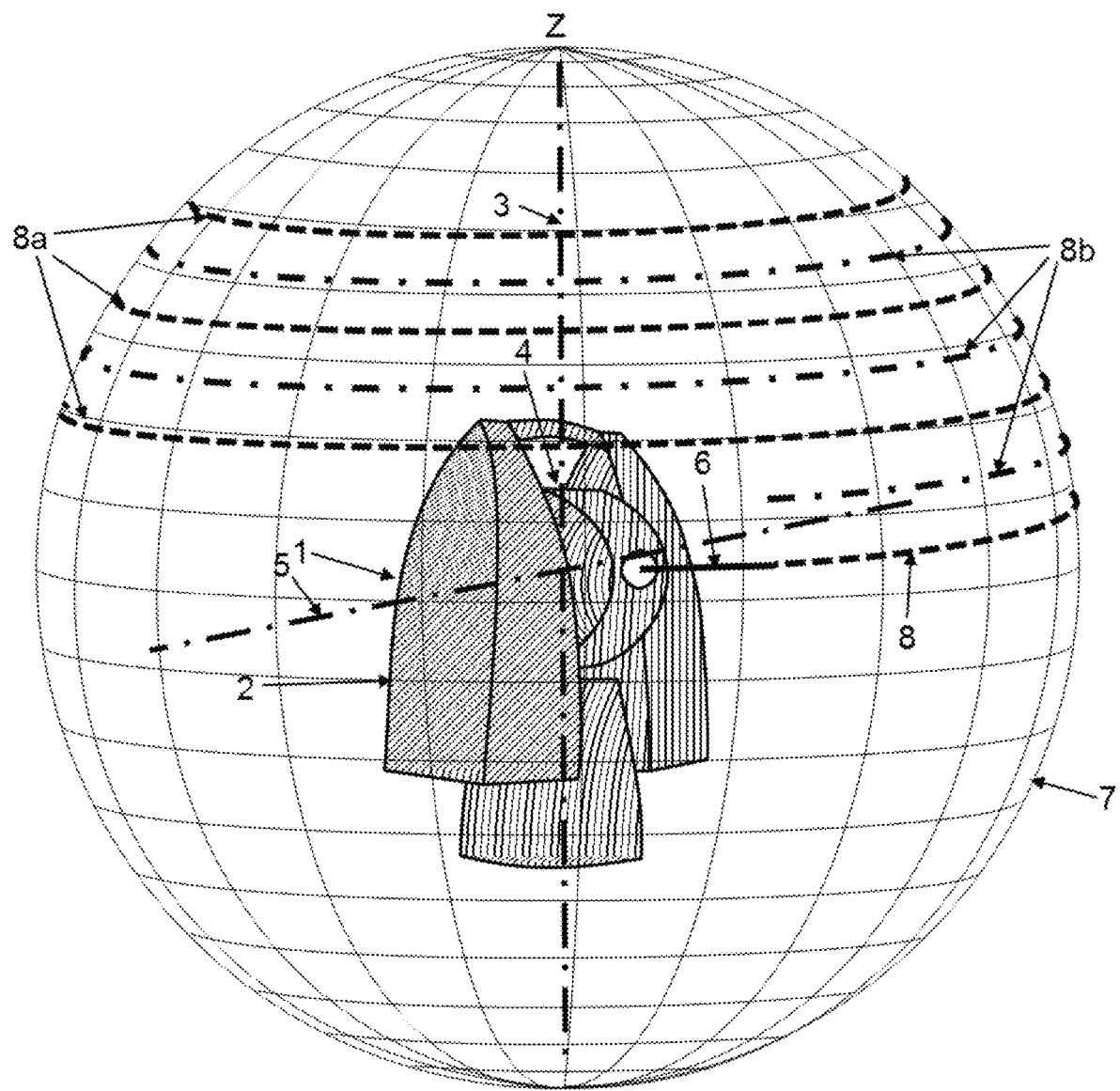

FIG. 2 shows an embodiment of an inventive total station 1, wherein the control unit is configured to generate a scan path 8 with a spiral path 8a as first section and a spiral path 8b as second section of the scan path. The rotor/alidade 2 is rotating faster at a higher angular velocity than the rotary body/telescope unit 4. The angular positions of path 8a and path 8b are offset to each other. The paths 8a and 8b were both made with the rotary body/telescope unit 4 turning in the same angular direction and with the rotor/alidade 2 turning in the same angular direction. The measuring radiation is guided along the first section 8a of the scan path during the first time interval. From the end of the first section 8a the measuring radiation 6 is guided, by repositioning, to a position with an offset to the starting position of the first section 8a. The offset is chosen such that parts of the second section 8b are essentially centrally located between adjacent parts of the first section 8a of the scan path 8.

Figure 3:
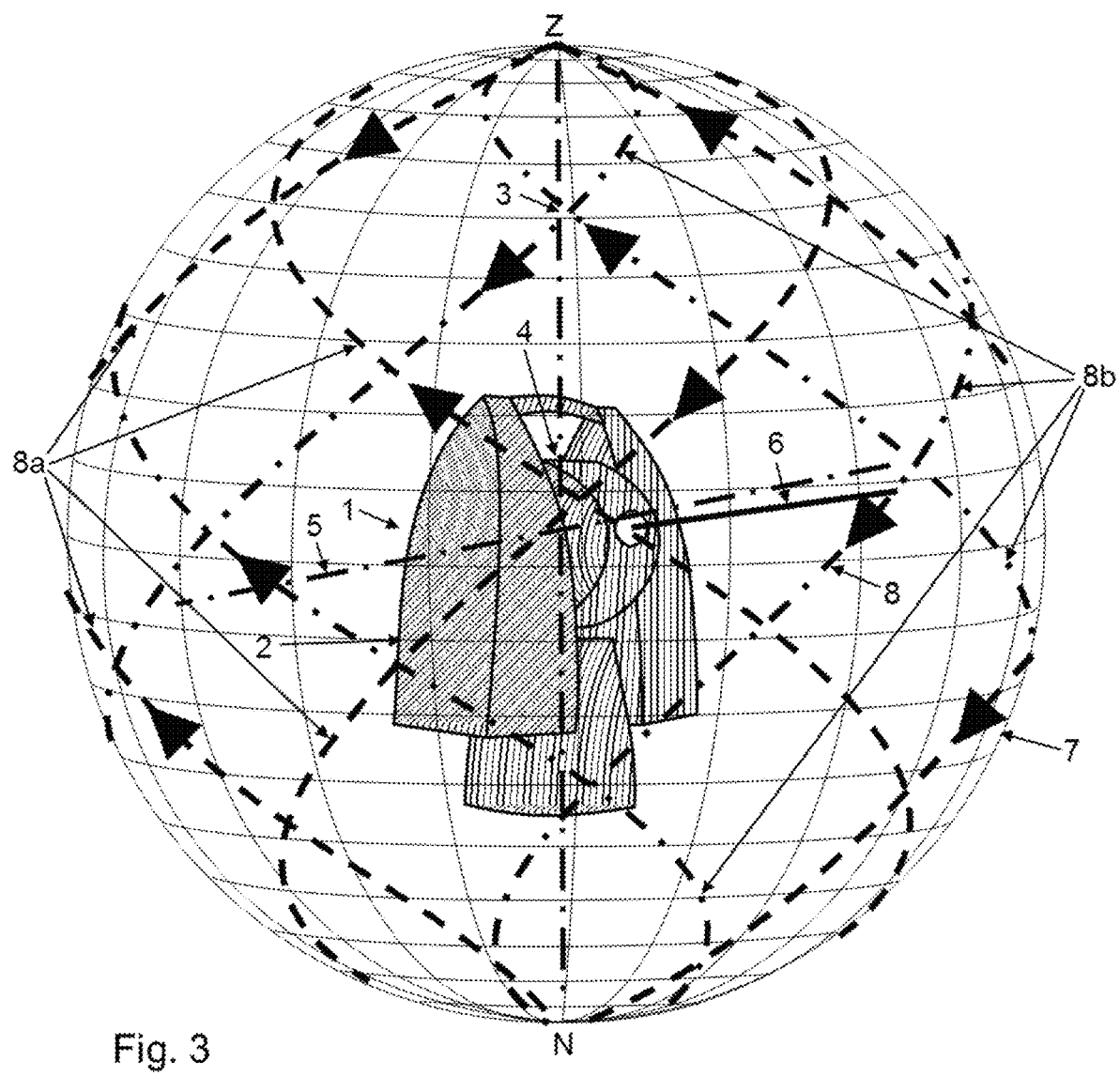

FIG. 3 shows an embodiment, wherein the control unit is configured to combine a continuous fast rotation of the rotor/alidade 2 about the vertical/azimuthal axis 3 with a variable angular velocity of the rotating rotary body/telescope unit 4. In a measuring region extending from the equator towards zenith and nadir, the scan path 8 has a longer component around the vertical/azimuthal axis than around the horizontal/elevation axis. The first section 8a of the scan path 8 with first measurement points are located in the measuring region and are passed by by the measuring radiation during the first time interval. During the second time interval the scan path 8 is providing second measurement points on the second section 8b, wherein parts of the second section 8b are positioned centrally between parts of the first section 8a.

Figure 4:
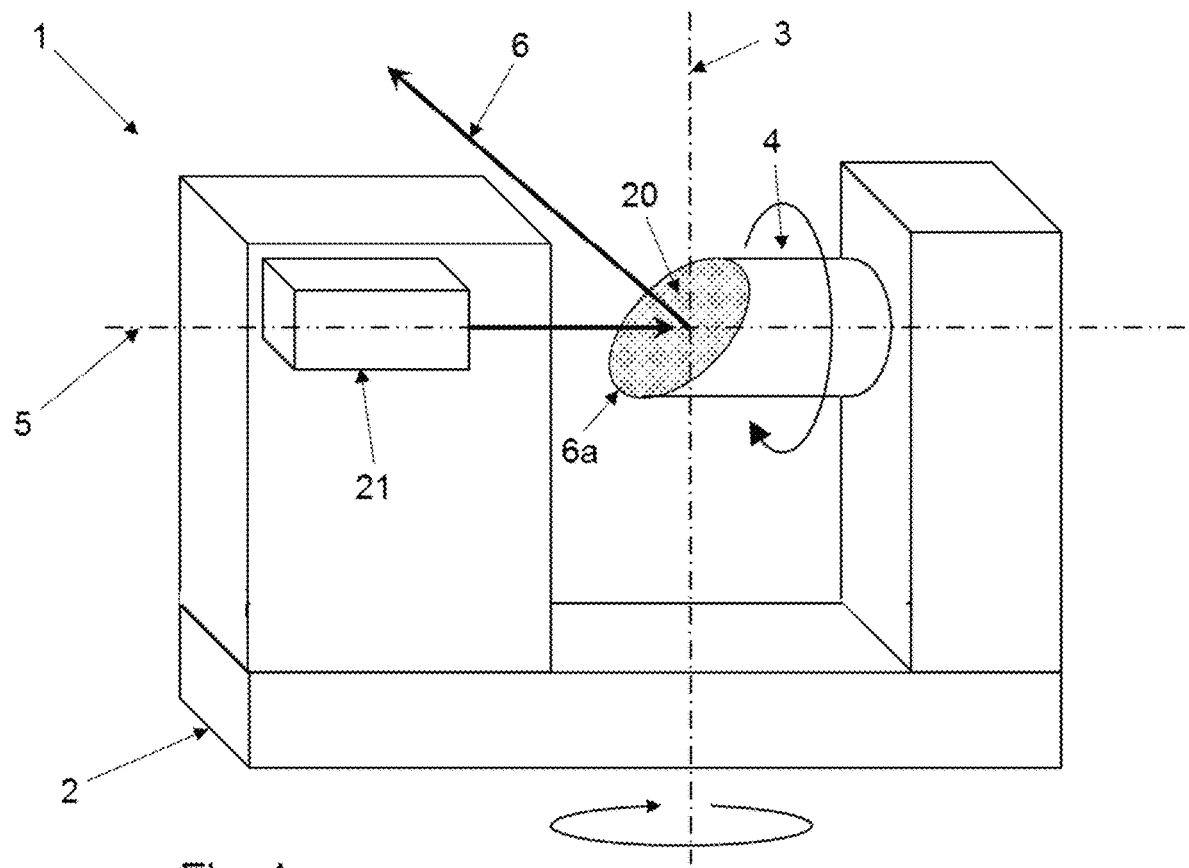
FIG. 4 is a schematic perspective view of a scanning device with a rotatable mirror by which measuring radiation is exiting from the rotary body and by which receiving radiation is entering and deflected towards the receiving radiation detecting unit, FIG. 5 schematically shows parts of the first section of a scan path with first measurement points on it and parts of the second section of the scan path with second measurement points on it, FIG. 6 schematically shows parts of the first section of a scan path with first measurement points on it and parts of the second section of the scan path with second measurement points on it, wherein first and second sections are fully overlaid on each other, FIGS. 7a, b show a schematic visualization of identifying a mismatch between measured distances of first and a second measurement points based on interpolating measured distances, FIG. 8 show a schematic visualization of identifying a mismatch between intensity data of first measurement points and second measurement points and filtering of mismatching data.

FIG. 4 shows a scanning device 1 with a rotary body 4 having a rotatable mirror 20. The scanning device 1 includes the rotor/alidade 2 mounted on a stator, not shown, and being rotatable about the vertical axis 3 in a motor driven manner. The mirror 20 is mounted on the rotary body 2 and is rotatable about the horizontal axis 5 in a motor driven manner. The horizontal axis 5 is substantially orthogonal to the vertical axis 3. The plane of the mirror 20 is arranged at an angle of 45° to the horizontal axis 5. The receiving radiation detecting unit 21 is located on the rotor/alidade 2. The measuring radiation is guided along the elevation axis 5 to the mirror 20, which is guiding the measuring radiation 6 in the predefined measuring direction along the target axis of the rotary body 4 towards a measurement point. The mirror 20 is the exit 6a for the measuring radiation. The mirror 20 is also guiding receiving radiation to the receiving radiation detecting unit 21. Therefore, in the embodiment of FIG. 4, the mirror 20 is also the entry for receiving radiation.

Figure 5:
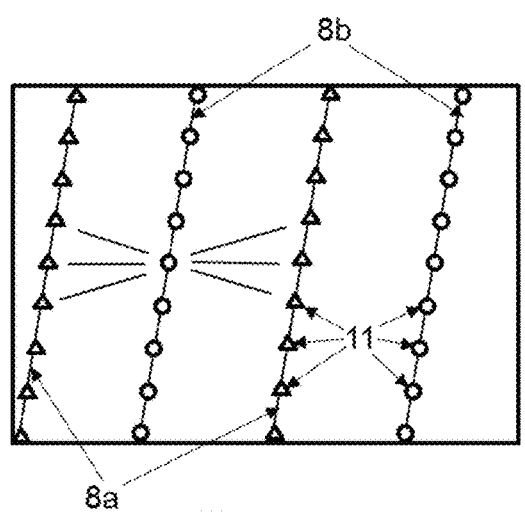

FIG. 5 shows parts of the first section 8a of a scan path and parts of the second section 8b of the scan path. Parts of the second section are centrally arranged between the parts of the first section. The measurement points 11 of the second section 8b are located between adjacent measurement points 11 of the first section 8a.

Figure 6:
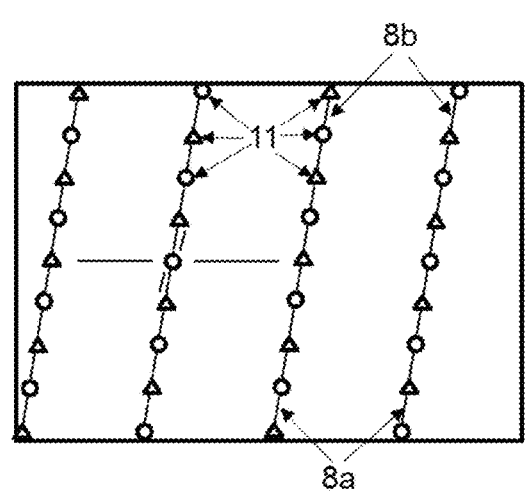

In FIG. 6 the second section 8b of the scan path 8 is located on the first section 8a. A specific triggering of the measurements ensures that the measurement points on the overlaying first and second sections 8a, 8b are positioned such that the measurement points 11 of the second section 8b are located between adjacent measurement points 11 of the first section 8a.

Figure 7A:
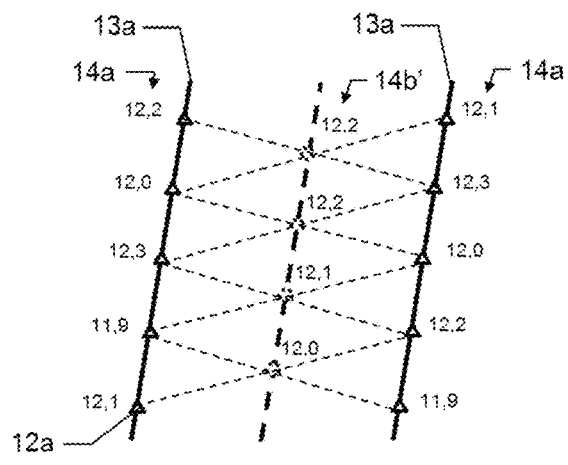
Figure 7B:
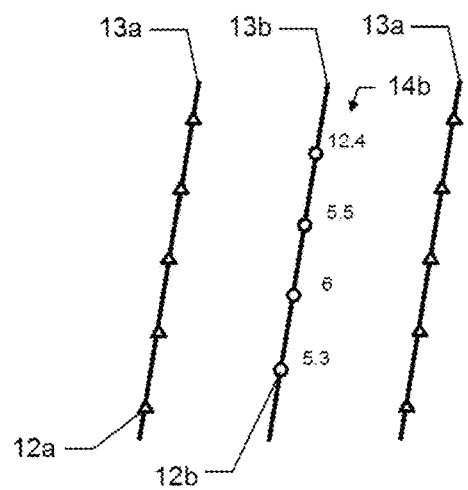

FIGS. 7a and 7b are visualizing an embodiment of identifying a mismatch between distance measurement data of first and second measurement points. Thereby, distance measurement data relates to measured distances. First measurement points 12a on the first section of the scan path are lined on first lines 13a. Second measurement points 12b on the second section of the scan path are lined on the second line 13b. FIG. 7a shows measured distances 14a derived from distance measurement data and associated with the corresponding first measurement points. Measured distances of first measurement points are used for interpolating measured distances for second measurement points. As-interpolated measured distances 14b' are shown in FIG. 7a and associated with virtual second measurement points lined on a virtual second line. FIG. 7b shows measured distances 14b assigned to second measurement points. By comparing measured distances 14b of second measurement points with interpolated measured distances 14b' a mismatch is identified. The difference between the measured distance of the lower three second measurement points of FIG. 7b and their interpolated measured distance can be indicative of measurement points being associated with a moving object.

Figure 8:
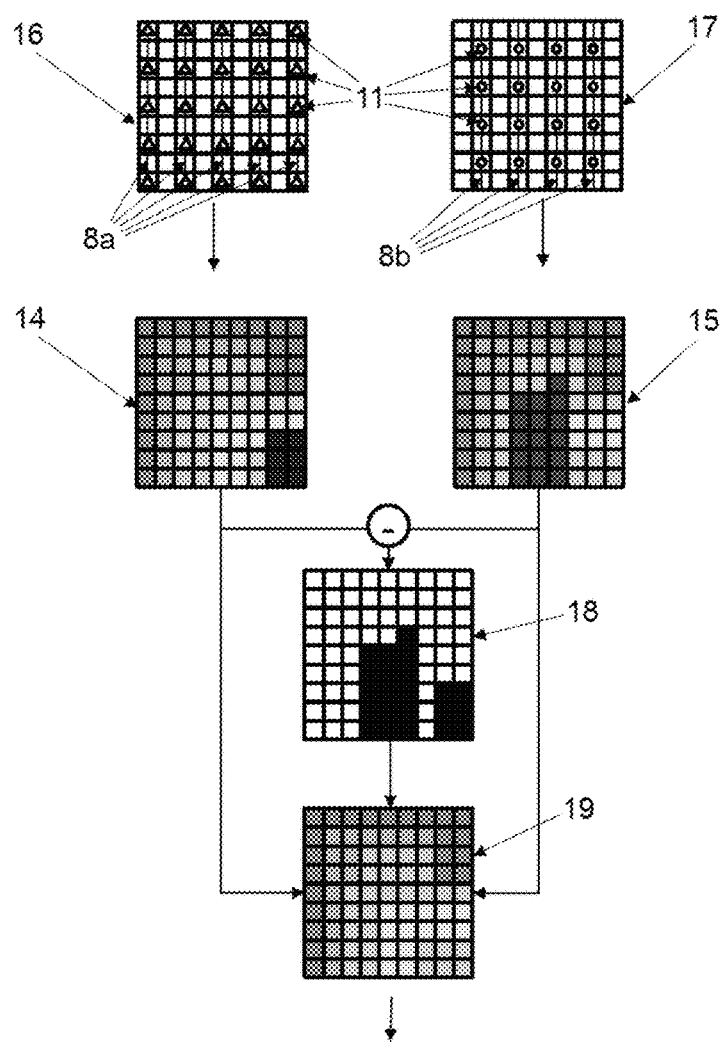

FIG. 8 is visualizing an embodiment of identifying a mismatch between distance measurement data of first and second measurement points and filtering of mismatching data. Thereby, distance measurement data relates to measured distances and intensity data. Identifying includes the generation of a first and a second intensity data array shown as intensity images 14 and 15. The first intensity image 14 is derived from distance measurement data 16 of first measurement points measured/scanned during the first time interval and the second intensity image 15 from distance measurement data 17 of second measurement points measured/scanned during the second time interval. Distance measurement data relating to measured distances can be displayed in the form of an intensity image by assigning grayscales to measured distance ranges. Distance measurement data relating to intensity data can be displayed in the form of an intensity image by assigning grayscales to intensity ranges.

Distance measurement data is averaged and/or interpolated to pixels of a grid extending at least over a given area of measurement region. In a preferred embodiment the grid is two dimensional, wherein the two axis of the intensity images 14, 15 correspond to the vertical/azimuth and horizontal/elevation angles determined by the angle encoding unit, namely the orientation of the rotor/alidade to the stator and the orientation of the rotary body/telescope unit to the rotor/alidade. The size of the pixels of the grid corresponds to a given scan resolution.

To detect deviations caused by moving objects, the difference between distance measurement data of corresponding array elements or pixels of the two intensity images 14, 15 is calculated and stored in a resulting intensity difference array or intensity difference image 18. The resulting intensity difference image 18 is generated based on using a given threshold value to identify array elements or pixels where measurement data of the two arrays or images differs by more than the given threshold value.

Filtering creates an improved distance measurement data array shown as improved intensity image 19. The improved distance measurement data includes improved distance measurement data for array elements to which the intensity difference array has values above the given threshold. Relating to measured distances the improved distance measurement data is preferably taken from that one of the two distance measurement data arrays that has larger distance values at the array elements to be improved. Relating to intensity data the decision on which elements to be used is based on how the elements to be improved fit in the first and second intensity image 14, 16 to the surrounding array elements.

In a preferred embodiment, identifying a mismatch between distance measurement data and filtering is based on a applying a combination of measured distances and intensity data. In this case moving objects can be identified by means of comparing two measured distance and two intensity data images, wherein given threshold values for measured distances and for intensity data are used.

Although the invention is illustrated above, partly with reference to some preferred embodiments, it must be understood that numerous modifications and combinations of different features of the embodiments can be made. All of these modifications lie within the scope of the appended claims.

What is claimed is:

1. A scanning device, built as total station or laser scanner configured to enable an efficient identification of scanned measurement points being associated with moving objects, comprising:
    a stator defining a vertical axis,
    a rotor mounted on the stator so as to be rotatable about the vertical axis,
    a rotary body, mounted on the rotor so as to be rotatable about a horizontal axis, with an exit for measuring radiation and an entry for receiving radiation,
    a rotary drive unit,
    an angle encoding unit,
    a measuring radiation source,
    a receiving radiation detecting unit,
    an evaluation unit, and
    a control unit,
    wherein:
    the vertical axis is substantially orthogonal to the horizontal axis,
    the rotary drive unit rotates the rotor and the rotary body,
    the measuring radiation exits the rotary body in a predefined measuring direction along a target axis to a measurement point,
    the angle encoding unit provides horizontal angle determination data and vertical angle determination data for determining a vertical angle and a horizontal angle of the target axis,
    the evaluation unit records distance measurement data and related angle determination data based on detected receiving radiation, and
    the control unit is configured to guide the measuring radiation:
        during a first time interval along a first section of a scan path to first measurement points under predefined first vertical and first horizontal angles on the first section, and
        during a second time interval along a second section of the scan path to second measurement points under predefined second vertical and second horizontal angles on the second section,
    the first and second time intervals are offset in time relative to each other, for at least a plurality of the second measurement points, the second measurement point is located between two adjacent first measurement points, such that:
        the second vertical angle of the second measurement point is between first vertical angles of the two adjacent first measurement points, and/or the second horizontal angle of the second measurement point is between first horizontal angles of the two adjacent first measurement points, and the evaluation unit is configured to evaluate:
distance measurement data of at least one first measurement point neighboring a second measurement point, and
distance measurement data of the second measurement point for identifying a mismatch between the distance measurement data,
wherein the control unit is configured to rotate:
the rotor at a first angular velocity, in particular being variable, and
the rotary body at a second angular velocity, in particular being variable,
wherein guiding the measuring radiation along first and second sections of the scan path is based on superposing a rotary movement of the rotor to a rotary movement of the rotary body; and
in case an angular velocity ratio of the first angular velocity to the second angular 30 velocity is smaller than 1:
a section of the scan path along which the measuring radiation is guided meanwhile the rotor is rotated from 0° to 180° around the vertical axis is the first section of the scan path with first measurement points thereon, and
a section of the scan path along which the measuring radiation is guided meanwhile the rotor is further rotated from 180° to 360° around the vertical axis is the second section of the scan path with second measurement points thereon, and in case the angular velocity ratio is larger than 1:
a section of the scan path along which the measuring radiation is guided meanwhile the rotary body is rotated from 0° to 180° around the horizontal axis is the first section of the scan path with first measurement points thereon, and
a section of the scan path along which the measuring radiation is guided meanwhile the rotary body is further rotated from 180° to 360° around the horizontal axis is the second section of the scan path with second measurement points thereof.

2. The scanning device according to claim 1, wherein identifying a mismatch is based on interpolating distance measurement data of more than one first measurement point neighboring the second measurement point to obtain interpolated distance measurement data for the second measurement point and comparing the distance measurement data of the second measurement point with the interpolated distance measurement data.

3. The scanning device according to claim 1, wherein one of:
a vertical angular distance, and
a horizontal angular distance
between measurement points is used for determining neighboring measurement points based on one of:
of nearest neighbor analysis, and
of using an angular distance threshold value.

4. The scanning device according to claim 1, wherein neighboring measurement points are filtered based on applying a filter criteria relating to a shape property, wherein the shape property is derived from analyzing distance measurement data of measurement points of a surrounding of the neighboring measurement points.

5. The scanning device according to claim 1, wherein the evaluation unit is configured to mark distance measurement data and/or measurement points based on an identified mismatch.

6. The scanning device according to claim 5, wherein the evaluation unit is configured to filter recorded distance measurement data and/or measurement points with respect to marked distance measurement data and/or measurement points.

7. The scanning device according to claim 5, wherein the evaluation unit is configured to reconstruct marked distance measurement data and/or measurement points based on using distance measurement data of neighboring measurement points.

8. The scanning device according to claim 1, wherein the control unit is configured to rotate the rotor about the vertical axis for 360°, wherein meanwhile the rotor is rotated for 360° the rotary body is consistently rotated about the horizontal axis.

9. The scanning device according to claim 1, wherein the angular velocity ratio is defined such that at least parts of the second section lie between adjacent parts of the first section.

10. The scanning device according to claim 1, wherein the angular velocity ratio is smaller than 1, in particular equal to or smaller than 1:200, 1:900, 1:1500 or 1:2000, or the angular velocity ratio is larger than 1, in particular equal to or larger than 900:1.

11. The scanning device according to claim 1, wherein the angular velocity ratio is different from 1, within a range from 1:10 to 10:1.

12. The scanning device according to claim 1, wherein the control unit is further configured to receive a user-input and based on the user-input guide the measuring radiation within a preconfigured scan mode, wherein:
within the preconfigured scan mode:
the angular velocity ratio is smaller than 1, and
the rotor is rotated about the vertical axis from 0° to 360°, meanwhile the rotary body is rotated about the horizontal axis for 360° multiple times, and
the evaluation unit is configured to assign distance measurement data, the vertical angle and the horizontal angle to measurement points, and evaluate distance measurement data of:
at least one first measurement point neighboring a second measurement point, and the second measurement point for identifying a mismatch between the distance measurement data.

13. The scanning device according to claim 7, wherein the control unit is configured to rotate:
the rotor at a first angular velocity, in particular being variable, and
the rotary body at a second angular velocity, in particular being variable,
wherein guiding the measuring radiation along first and second sections of the scan path is based on superposing a rotary movement of the rotor to a rotary movement of the rotary body.

14. The scanning device according to claim 9, wherein the control unit is configured
to rotate the rotor about the vertical axis for 360°, wherein meanwhile the rotor is rotated
for 360° the rotary body is consistently rotated about the horizontal axis.

15. The scanning device according to claim 1, wherein the angular velocity ratio is defined such that at least parts of the second section lie between adjacent parts of the first section.

16. The scanning device according to claim 9, wherein the angular velocity ratio is
- smaller than 1, in particular equal to or smaller than 1:200, 1:900, 1:1500 or 1:2000, or
- the angular velocity ratio is larger than 1, in particular equal to or larger than 900:1.

17. The scanning device according to claim 9, wherein the angular velocity ratio is different from 1, within a range from 1:10 to 10:1.

18. A non-transitory computer program product, comprising instructions to configure a scanning device according to the configuration of the device of claim 1.

\* \* \* \* \*